United States Patent
Würsch et al.

(10) Patent No.: US 11,225,031 B2
(45) Date of Patent: Jan. 18, 2022

(54) ROLLER ELECTRODE ARRANGEMENT, APPARATUS COMPRISING A ROLLER ELECTRODE ARRANGEMENT, AND METHOD FOR APPLYING A HIGH-FREQUENCY ALTERNATING ELECTRIC FIELD TO TWO PLASTIC MATERIAL PORTIONS

(71) Applicant: Consultengineerip AG, Buonas (CH)

(72) Inventors: Christoph Würsch, Werdenberg (CH); Tindaro Pittorino, Graps (CH); Ulrich Gubler, Buonas (CH)

(73) Assignee: Consultengineerip AG, Buonas (CH)

( * ) Notice: Subject to any disclaimer, the term of this patent is extended or adjusted under 35 U.S.C. 154(b) by 0 days.

(21) Appl. No.: 17/251,331

(22) PCT Filed: Jun. 11, 2019

(86) PCT No.: PCT/EP2019/065190
§ 371 (c)(1),
(2) Date: Dec. 11, 2020

(87) PCT Pub. No.: WO2019/238665
PCT Pub. Date: Dec. 19, 2019

(65) Prior Publication Data
US 2021/0252795 A1    Aug. 19, 2021

(30) Foreign Application Priority Data
Jun. 12, 2018   (DE) .................... 10 2018 113 999.3

(51) Int. Cl.
*B29C 65/04*   (2006.01)
*B29C 65/00*   (2006.01)

(52) U.S. Cl.
CPC .......... *B29C 65/04* (2013.01); *B29C 66/1122* (2013.01); *B29C 66/43* (2013.01);
(Continued)

(58) Field of Classification Search
CPC ............... B29C 65/04; B29C 66/83411; B29C 66/83417; B29C 66/83413
See application file for complete search history.

(56) References Cited

U.S. PATENT DOCUMENTS 2,522,823 A  *  9/1950  Hayes ..................... B29C 66/43
                                                               219/768
2,706,233 A     4/1955  Yamaguchi
(Continued)

FOREIGN PATENT DOCUMENTS

DE    1154932 B    9/1963
DE    29906706 U1  7/1999
(Continued)

OTHER PUBLICATIONS

International search report for patent application No. PCT/EP2019/065190 dated Aug. 23, 2019.

*Primary Examiner* — Scott W Dodds
(74) *Attorney, Agent, or Firm* — Bachman and LaPointe PC; George Coury (57) ABSTRACT

A roller electrode assembly (1) for applying a high-frequency alternating electric field to a workpiece (5a, 5b) has a core (2) which is at least partially made of electrically conductive material and surrounded by a tire (3) which can be filled with a protective gas and is made of a dielectric material.

13 Claims, 5 Drawing Sheets

(52) U.S. Cl.
   CPC .... *B29C 66/73921* (2013.01); *B29C 66/8122* (2013.01); *B29C 66/81459* (2013.01); *B29C 66/8362* (2013.01); *B29C 66/83413* (2013.01); *B29C 66/83417* (2013.01)

(56) References Cited

U.S. PATENT DOCUMENTS

| | | | |
|---|---|---|---|
| 2005/0003942 A1* | 1/2005 | Long | B65B 41/00 493/215 |
| 2014/0262008 A1* | 9/2014 | Balaji | B29C 63/0073 156/272.2 |

FOREIGN PATENT DOCUMENTS

| | | | |
|---|---|---|---|
| GB | 726885 A | 3/1955 | |
| GB | 2367784 A | 4/2002 | |

* cited by examiner

Figure 2
State of the Art

Figure 1
State of the Art

ROLLER ELECTRODE ARRANGEMENT, APPARATUS COMPRISING A ROLLER ELECTRODE ARRANGEMENT, AND METHOD FOR APPLYING A HIGH-FREQUENCY ALTERNATING ELECTRIC FIELD TO TWO PLASTIC MATERIAL PORTIONS

BACKGROUND OF THE INVENTION

The invention relates to a roller electrode assembly as well as an apparatus comprising such a roller electrode assembly and a method for applying a high-frequency alternating electric field to a workpiece.

Roller electrodes for high frequency welding of plastics are known.

Like other welding processes, high frequency welding of plastics is used for the permanent joining of two workpieces or sections, here two plastic workpieces or sections, which are subjected to heat and pressure.

It is known to produce tarpaulins for vehicles, sun protection tarpaulins, advertising space, clothing, packaging, inflatable products such as inflatable boats and bouncy castles as well as water beds and flexible liquid tanks and much more by means of plastic high frequency welding.

In plastic high frequency welding, two sections of one or more plastic workpieces to be joined are usually heated locally by applying an alternating electric field, which melts them. The workpieces are simultaneously pressed together, which permanently joins them together.

Heating is caused by interaction between the alternating electric field and polar components of the polymer or plastic. This results in local heating because dipoles present in the plastic try to align themselves in the electric field, although they are firmly embedded in the polymer structure of the plastic.

Whether a plastic can be processed by high frequency, welding depends on its molecular structure, or more precisely on the presence of dipoles. For this reason, only certain plastics can be processed using high frequency welding. Decisive for weldability is the dielectric loss of the plastic, which is a measure of the energy loss that the plastic in question causes as an insulating material in the electric field. For example, plastics such as thermoplastic polyurethane (TPU), polyvinyl chloride (PVC), ethylene-propylene-diene rubber (EPDM) or poly methyl methacrylate (PMMA) can be considered. Plastics with a dielectric loss greater than 0.01, preferably greater than 0.1, are well suited for high frequency welding. TPU usually has a dielectric loss of about 0.07; PVC usually has a dielectric loss greater than 0.1.

Due to the high power with which high-frequency plastic welding systems are operated, which is sometimes in the two-digit kilowatt range, certain frequencies to be observed are prescribed by law. The most commonly used electrical alternating field with a frequency of 27.12 MHz is the so-called "ISM band", which can be freely used by high-frequency equipment in industry, for example.

Machines for high frequency welding (HF welding) of plastics generally comprise a generator or high frequency generator, welding electrodes and a press. The aforementioned components may be at least partially combined. The generator provides a high-frequency electrical alternating voltage, for example at 27.12 MHz, and usually several kilovolts. The press serves to press the welding electrodes onto the workpiece or sections to be welded and the electrodes are used to heat the plastic locally by generating the alternating field.

Apparatuses and processes for high frequency plastic welding are known in numerous designs. If the system is operated continuously, it is known, for example, to move the plastic sections to be welded between two roller-shaped electrodes. One problem encountered here is sparking at several locations.

On the one hand, sparking can occur at a contact point between a supply line from the generator and the electrode, which is often designed as a sliding contact when the electrodes are rotating during operation. In the prior art this sparking has been counteracted by the selection of high quality and reliable sliding contacts.

On the other hand, sparking can occur due to plasma discharge. This plasma discharge occurs in areas between the electrodes where there is a sufficiently high electric field strength. In the case of roll-shaped electrodes, such areas are present on both sides of a pressure zone between the electrode and the workpiece to be processed and are essentially wedge-shaped.

The DE 1 154 932 A, for example, which also addresses the problem of spark formation, is known from the prior art. According to DE 1 154 932 A, however, sparking occurs due to defective point contacts. Accordingly, the DE 1 154 932 A proposes to equip one of the roll-shaped electrodes with an external helical wire spring which is flexible and can be partially pressed in by the opposite roll-shaped electrode. Thus, a flat contact takes the place of the point contact, which reduces the risk of sparking. However, there is still a risk of sparking due to plasma discharges in the area directly adjacent to the contact point of both electrodes. This problem is not solved by DE 1 154 932 A.

The GB 2 367 784 A is also known from the prior art, which reveals an apparatus for continuous sealing of films. Furthermore the DE 299 06 706 U1 is known, which reveals a robot-guided roller seam welding pliers.

Another problem of known apparatuses and processes for high frequency plastic welding is the insufficient pressurization of plastic sections to be welded.

In order to extend a pressure zone, it was proposed in the prior art to assign a concave counter-electrode to a roller-shaped electrode, which also serves as a press, which is shaped complementary to the roller-shaped electrode and thus extends the pressure zone. However, this makes the apparatus very inflexible with regard to the design of different materials to be processed. For example, a weld seam geometry that has curves cannot be processed with a concave counter electrode.

Furthermore, the prior art includes additional pressure rollers, which however also increase the complexity of the system at the expense of flexibility with regard to any materials to be processed. Here, too, there is always the problem that only straight welds without curves can be produced.

The prior art also includes DE 299 06 706 U1 directed to a robot-guided roller seam welding pliers and GB 2 367 784 A concerning an apparatus and process for welding polymer workpieces.

SUMMARY OF THE INVENTION

The purpose of the present invention is to overcome the disadvantages of the prior art. In particular, a roller electrode assembly or an apparatus comprising such a roller electrode assembly shall be provided which is as flexible as possible with respect to the workpiece(s) to be welded and at the same time provides the best possible contact pressure or contact pressure zone and efficiently reduces the risk of sparking.

The solution of the problem is provided by the subject matter disclosed herein.

Advantageous embodiments are also described herein and in the dependent claims.

A roller electrode assembly in accordance with the present invention for applying a high-frequency alternating electric field to two plastic sections of at least one workpiece comprises a core, which is at least partially made of electrically conductive material and is surrounded by a tire, which can be filled with a protective gas and is made of a dielectric material.

Preferably, the tire is filled with the protective gas. The protective gas can be selected from the following group: sulfur hexafluoride ($SF_6$) or a gas mixture containing sulfur hexafluoride, a fluoronitrile or a gas mixture containing a fluoronitrile; a fluoroketone or a gas mixture containing fluoroketone, carbon dioxide or a gas mixture containing carbon dioxide. Fluoronitriles and/or fluoroketones can thus be regarded as substitutes for sulphur hexafluoride. Of course, many other gases or gas mixtures can be used, especially those, which are already, used as protective gases in high-voltage engineering.

The tire preferably has a valve for introducing and/or removing the protective gas. In this way, for example, the protective gas or protective gas mixture used can be refilled if an undesirable gas loss occurs. Furthermore, the valve can also be used to completely deflate the tire and replace the protective gas or protective gas mixture or to replace it with another protective gas or protective gas mixture. Finally, the desired degree of inflation of the tire can also be set using the valve.

The tire preferably consists of a dielectric with a small dielectric loss, for example less than 0.01, more preferably less than 0.005 and even more preferably less than 0.001. After all, the tire should only pressurize the at least one workpiece, but should not be heated and welded itself.

If, for example, the roller electrode assembly is pressed onto two plastic sections to be welded together in order to weld them together, the tire deforms, which leads to an increase in the pressure zone. By applying the pressure required for welding over an enlarged zone compared to uncoated roller electrode assemblies and compared to roller electrode assemblies with a rigid coating, the plastic sections to be joined are pressurized for a longer period of time, which in turn improves the quality of the joint. Therefore, for example, the speed of continuous HF plastic welding can be increased compared to known processes. Furthermore, separate pressure elements such as pressure rollers and the like can be omitted.

However, a major advantage is that the tire is made of a dielectric and is therefore electrically insulating. This means that in the immediate vicinity of the pressure zone, where the field strength of the alternating electric field is very strong, and the risk of plasma formation and, accordingly, of plasma discharge is at least greatly reduced.

The tire can be made of a plastic material. As already mentioned, care should be taken that the plastic does not or not significantly interact with the alternating electric field or is largely inert to it. For example, elastomers or silicones with a correspondingly low dielectric loss may be considered. For example, the thickness of a tire can be between 0.1 mm and 5 mm. The range between 0.2 mm and 4 mm may also be considered, as well as the range between 0.3 mm and 3 mm and the range between 0.4 mm and 2.5 mm, and preferably the range between 0.5 mm and 2 mm.

In the context of the present invention, a roller electrode assembly is considered to be an apparatus or assembly comprising an electrode with a circular cross-section, which can move in a rolling manner over a workpiece. If a fixed roller electrode assembly is to be used, it may alternatively be considered to move the workpiece accordingly relative to the electrode while the latter is fixedly mounted but at the same time performs a rotational movement.

The roller electrode assembly can, for example, be cylindrical or at least substantially cylindrical or spherical or at least substantially spherical. Furthermore, differently shaped roller electrode assemblies can be considered, which can move rollingly over a workpiece or relative to it.

A particular advantage of an at least essentially spherical roller electrode assembly is that plastic sections with complex weld seam geometry can also be reliably welded together. In contrast, numerous roller electrodes known from prior art can only reliably weld those sections that require a straight weld seam.

The workpiece to be processed or the sections to be joined or welded are weldable plastics with a correspondingly high dielectric loss. The high-frequency electric alternating field is preferably an alternating field with a frequency of 27.12 MHz. However, it can also be intended for other frequencies, especially industrial frequencies or ISM bands. In particular, the following ISM bands can be used: 6.765 MHz to 6.795 MHz; 13.553 MHz to 13.567 MHz; 26.957 MHz to 27.283 MHz; 40.66 MHz to 40.70 MHz; 433.05 MHz to 434.79 MHz or 902 MHz to 928 MHz. Especially the central frequencies of the ISM bands can be considered, for example 13.56 MHz, 40.68 MHz or 433.92 MHz.

The present invention shall also include an apparatus for applying a high-frequency alternating electric field to a workpiece, comprising a high-frequency generator and at least one roller electrode assembly as described above. This apparatus will be described below.

Such generators are sufficiently known from the prior art. The apparatus always includes a second electrode or counter electrode or counter electrode assembly. Here, for example, a flat electrode can also be considered. Thus, it is possible to design a part of a table, on which the sections to be welded are located, in the form of a flat electrode. Inserting a flat electrode into a table or the like is also possible.

Preferably, however, the counter electrode assembly is designed in the same way as the roller electrode assembly described above. Such an assembly is much easier to handle than an assembly in which part of the table is designed as an electrode, for example because the table and the associated electrode, which may be embedded in the table, are usually very large.

Preferably, both electrode assemblies also act as pressure elements, with appropriate means applying force to the electrode assembly, which is directed towards the workpiece. Thus, separate pressure elements are not required.

Preferably, the at least one roller electrode assembly is arranged to be actuated to transport the workpiece to be processed. Thus, no separate feed or transport means are necessary. If the apparatus comprises two roller electrode assemblies, only one can be actuated, whereas the second one preferably rotates passively by the movement of the workpiece caused by the first roller electrode assembly. On the other hand, it can also be considered that both roller electrode assemblies rotate or are actuated actively, which should preferably take place synchronously.

The roller electrode assembly or the roller electrode assemblies can each be supported in an air bearing or in a roller bearing. Especially in the case of an at least essentially cylindrical roller electrode assembly, numerous types of bearing are conceivable, which, for example, act on the roller electrode assembly via a central axis of the roller electrode assembly. In case of at least essentially spherical roller electrode arrays, especially a bearing via roller bearings or in general a bearing similar to known computer mice of older generation or similar to the bearing of known trackballs in input devices is used. Furthermore, at least with essentially spherical roller electrode assemblies, air bearings may be considered.

Preferably, the apparatus comprises a device for contactless transmission of energy or an electrical high frequency to the at least one roller electrode assembly. This is advantageous because in contrast to sliding contacts and the like, for example, the risk of a spark at a contact point between supply line and electrode is significantly reduced. Contactless transmission can be achieved, for example, by capacitive coupling, whereby energy is transmitted wirelessly by means of an electric field. Appropriate apparatuses are sufficiently known from the prior art.

As already mentioned, a second roller electrode assembly can be assigned to a roller electrode assembly, which fulfills both the task of the counter electrode and the task of a counter pressure element.

Alternatively, the apparatus can include a table as counter pressure element. A flat counter electrode can be embedded or worked into the table in the way described above.

Furthermore, the apparatus can not only be used as an alternative to the counter electrode, it may also comprise a complementary table. This can, for example, serve as a support table for the workpieces or sections to be welded. The support table can, for example, include a recess through which the counter-electrode contacts the workpieces to be welded.

A table serving as a counter pressure element with an embedded counter electrode can represent an essentially flat counter pressure element. Alternatively, however, the table can have three-dimensional contours, which can be adapted to the sections to be joined, for example.

An apparatus comprising an axis system or an articulated robot on which the roller electrode assembly/assemblies is/are guided can also be conceived. With such an assembly, welding can be highly automated and performed very quickly. Corresponding axis systems and articulated robots are sufficiently known from the prior art.

The present invention further relates to a method for applying a high-frequency alternating electric field to a workpiece by means of an apparatus as described above, wherein the workpiece to be processed is also applied with a force by means of a roller electrode assembly as also described above.

With regard to this procedure, it may be considered to let the transmission of the electrical high frequency to the roller electrode assembly or at least to one of the roller electrode assemblies take place contactless, for example by the principle of capacitive coupling.

The apparatus is in particular an apparatus for high frequency welding of plastics. However, it may also be conceived to use the alternating electric field for other purposes, for example for gluing two workpieces or sections.

In general, it can always be considered to join two sections of the same workpiece or two sections of different workpieces together, especially to weld them together.

If two workpieces are joined together, they are preferably made of the same material. However, both may also be made of different materials. In this case, it can be advantageous to use, for example, thermoplastic polyurethane (TPU) as a connector or welding filler.

The apparatus may apply a force to the at least one workpiece in such a way that the protective gas inside the tire is displaced in such a way that the core lies directly or almost directly on the tire in the middle of the pressure zone, i.e. there may be no or hardly any protective gas between an inner surface of the tire and the core.

BRIEF DESCRIPTION OF THE DRAWINGS

Further advantages, features and details of the invention can be found in the following description of preferred embodiments as well as in the drawings; these are shown in.

DETAILED DESCRIPTION

Figure 1:
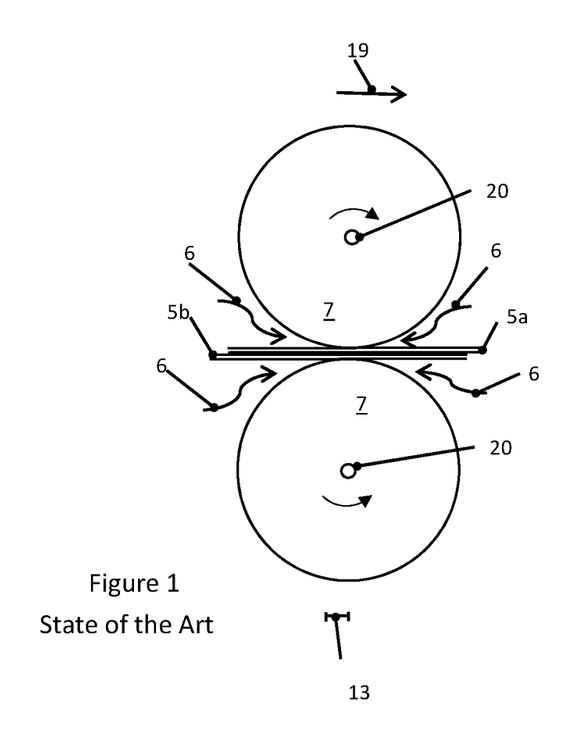
FIG. 1 an assembly comprising two roller electrodes 7 according to the prior art, FIG. 2 an assembly comprising a roller electrode 7 and a flat counter electrode 8 according to the prior art, FIG. 3 a roller electrode assembly 1 according to an embodiment of the present invention, FIG. 4 a sidewards cutaway drawing according to FIG. 3 with further details, FIG. 5 an assembly comprising the roller electrode assembly 1 according to FIG. 3, FIG. 6 a sidewards cutaway drawing according to FIG. 5 with further details, FIG. 7 an assembly comprising two roller electrode assemblies 1 according to a further embodiment of the present invention, FIG. 8 a sidewards cutaway drawing according to FIG. 7 with further details in a first version, FIG. 9 a sidewards cutaway drawing according to FIG. 7 in a second version and FIG. 10 a sidewards cutaway drawing according to FIG. 7 in a third version.

FIG. 1 shows an assembly comprising two roller electrodes 7 according to the prior art.

Figure 2:
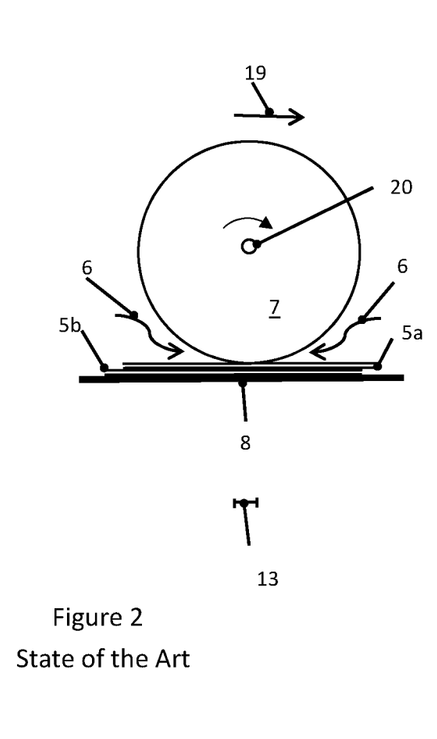

FIG. 2 shows an assembly according to the prior art which, in comparison to the assembly according to FIG. 1, comprises a flat counter electrode 8 instead of the lower roller electrode 7, for example in the form of a table.

Figure 3:
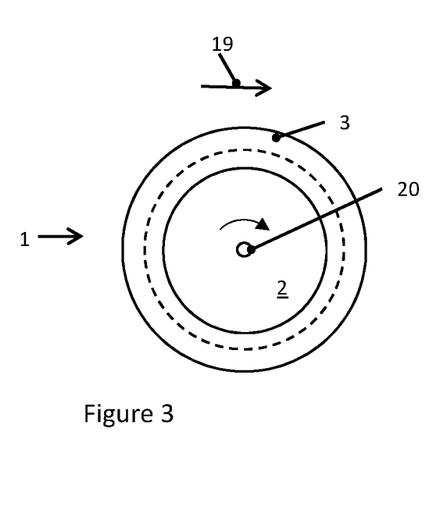

FIG. 3 shows a roller electrode assembly 1 according to an embodiment of the present invention. The roller electrode assembly 1 comprises a core 2 and a tire 3, which can be filled with a protective gas and consists of a dielectric material, hereinafter referred to as tire 3. Furthermore, an axis of rotation 20 is shown.

Figure 4:
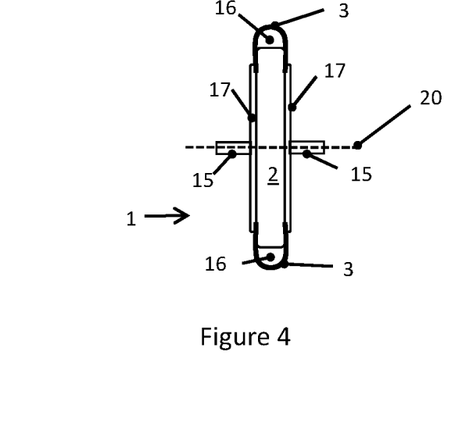

FIG. 4 shows a cutaway side view according to FIG. 3, where further details are visible, in particular demi-axes 15 of the roller electrode assembly 1 and an interior 16 of tire 3. From the view shown in FIG. 4 it can be clearly seen that mainly a tread of core 2 is surrounded by tire 3. Dielectric cover plates 17 are arranged laterally.

Figure 5:
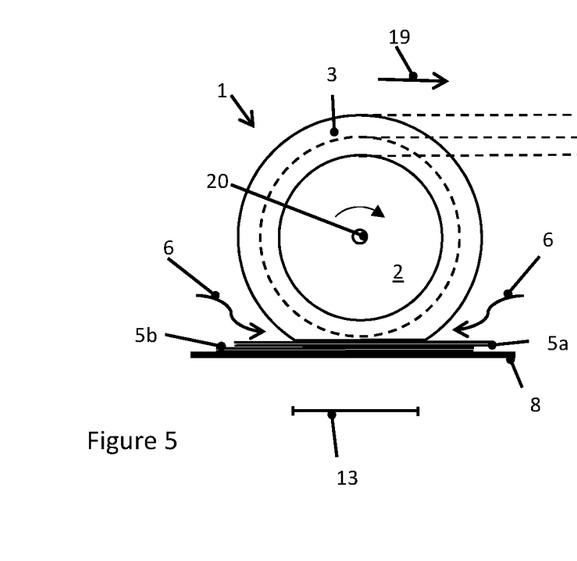

FIG. 5 shows an assembly similar to FIG. 2 but with a roller electrode assembly 1 as shown in FIG. 3.

Figure 6:
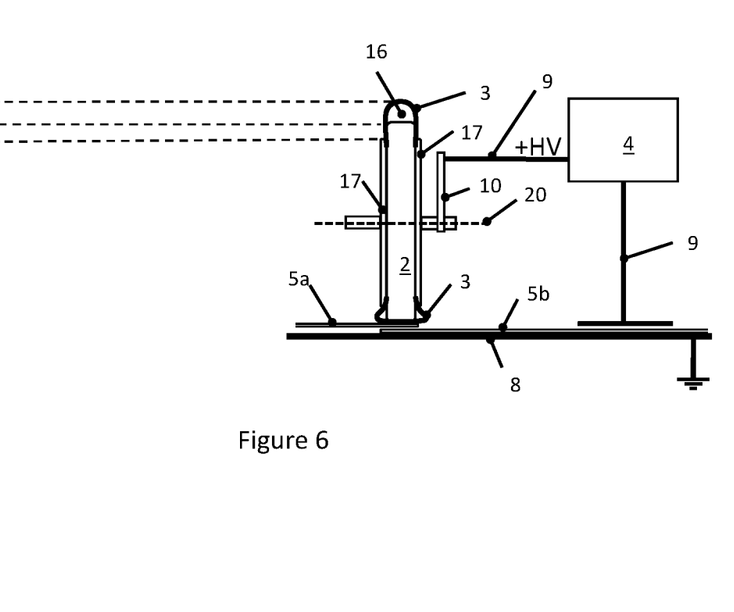

FIG. 6 shows a sidewards cutaway drawing according to FIG. 5, with further details visible, in particular a generator 4, a collector 10 and supply lines 9. The dotted arrows between FIGS. 5 and 6 illustrate the position of an outer circumference of tire 3, an outer circumference of core 2 and an inner circumference of tire 3.

Figure 7:
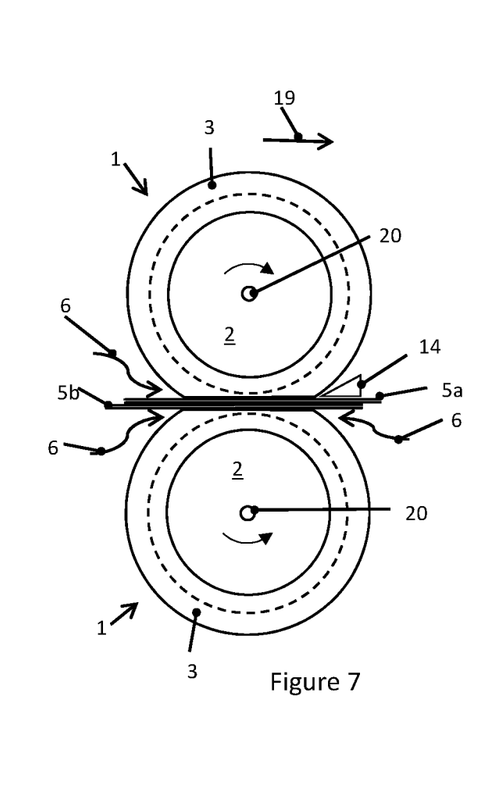

The outer circumference of core 2 is also indicated by a circular dotted line in FIGS. 3, 5 and 7.

FIG. 7 shows an assembly similar to FIG. 1 but with two roller electrode assemblies 1 according to a further embodiment of the present invention.

Figure 8:
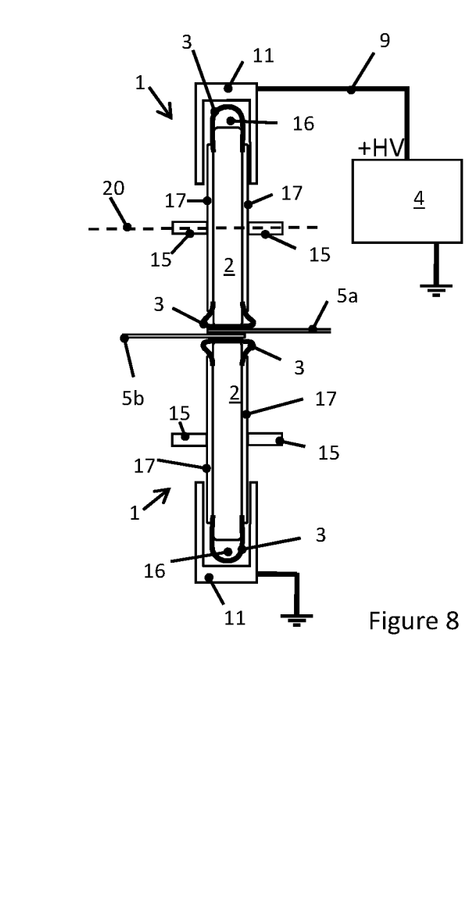
Figure 9:
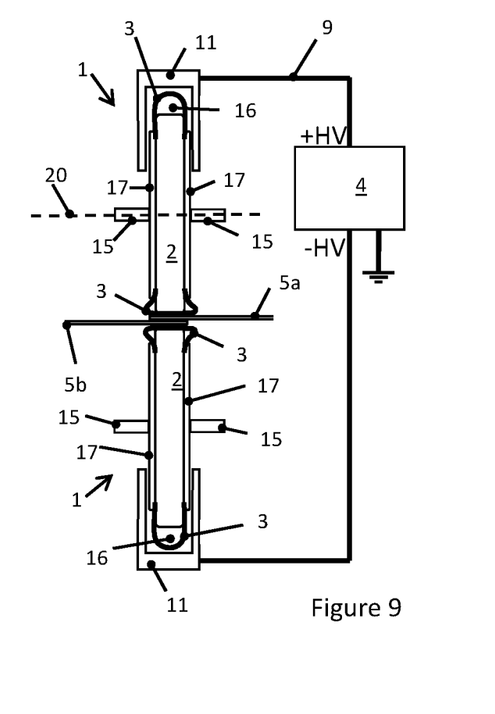
Figure 10:
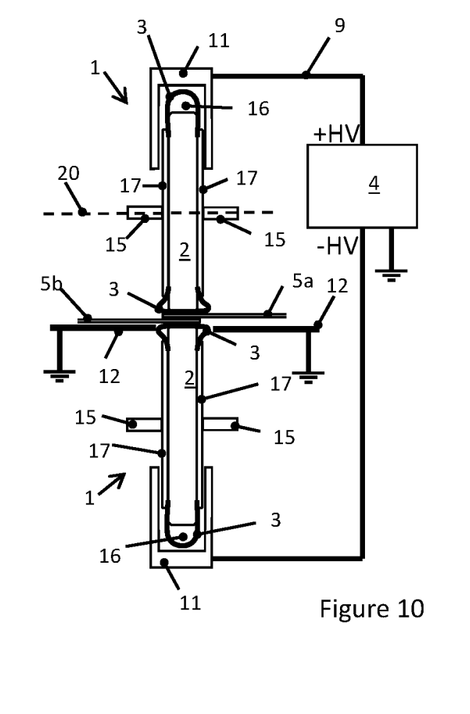

FIGS. 8 to 10 show sidewards cutaway drawings according to FIG. 7 in three versions, with further details visible, for example the dielectric cover plates 17, the demi-axes 15, the generator 4 with the supply line 9, the devices 11 for contactless transmission and in each case the interiors 16 of the tires 3. The embodiments of FIGS. 8, 9 and 10 differ in each case with respect to their interconnection, in particular with respect to their contact with the generator 4. In the embodiments according to FIGS. 8 to 10, at least one of the roller electrode assemblies 1 is in contactless connection with the generator 4 via a device for transmission 11.

From FIGS. 3 to 10 it can be seen that tire 3 does not exclusively rest on one tread of core 2, but also partially surrounds both sides of core 2. That section of both sides of the core 2 which is not surrounded by the tire 3 is covered by a dielectric cover disk 17.

The devices for contactless transmission 11 are U-shaped electrodes that partially surround the roller electrode assembly 1.

In FIG. 8, the roller electrode assembly 1 shown below, which acts as a counter electrode, is grounded via the contactless transmission device 11. An output of the generator 4 is also grounded.

In FIG. 9, both roller electrode assemblies 1 are connected to generator 4, but with opposite polarity.

In FIG. 10, a grounded support table 12 is provided in addition to the assembly according to FIG. 7.

For the sake of clarity, not all the features shown in all the figures are designated by reference numbers.

With reference to FIGS. 1 to 10, the operation of the apparatus of the invention is explained as follows:

Apparatuses comprising at least one roller electrode 7 are known from the state of the art. They weld two workpieces 5a, 5b or two sections of one workpiece together.

In an apparatus according to FIG. 1, both roller electrodes 7 rotate in opposite directions around the rotation axes 20, as indicated by the arrows inside the roller electrodes 7. The roller electrodes 7 move relative to the workpieces 5a, 5b in the direction of an arrow 19.

In an apparatus according to FIG. 2, the roller electrode 7 rotates and thus moves in the direction of arrow 19 along the workpieces to be welded 5a, 5b, which are mounted on a flat counter electrode 8, which usually functions as a table or as part of a table. In both versions of known apparatuses, for example, undesired plasma formation and plasma discharge occurs in an essentially wedge-shaped area indicated by arrows 6, since in this area the field strength of the electric field emitted or generated by the roller electrodes 7 is very strong. The risk of such a plasma discharge with spark formation and the associated undesired effects and dangers increases proportionally to the field strength and is therefore highest in the assemblies shown in FIGS. 1 and 2 in the immediate vicinity of a pressure zone within which the workpieces 5a, 5b are pressed together by the electrodes 7, 8.

A length 13 of the respective pressure zone, i.e. the section within which the workpieces 5a, 5b are subjected to pressure, is indicated below the apparatuses for the sake of clarity.

In the assembly according to FIG. 3, the core 2 is the actual electrode, which is surrounded by the tire 3. The roller electrode assembly 1 is shown separately in FIGS. 3 and 4.

FIGS. 5 and 6 show the roller electrode assembly 1 in operating position together with a flat counter electrode 8.

The deformation of the tire 3 of the roller electrode assembly 1 is clearly visible in FIG. 5, which leads to a significantly increased length 13 of the pressure zone compared to the assembly according to FIG. 2. Furthermore, FIG. 5 shows that the immediate vicinity of the point where the electrode or core 2 and the flat counter electrode 8 come closest to each other is provided or filled by tire 3. Those regions of the essentially wedge-shaped areas indicated by arrows 6, where air is present and plasma can be formed, have a significantly greater distance between the electrodes, i.e. in FIG. 5 the core 2, and the flat counter electrode 8, compared to the assembly according to FIG. 2. Thus, the field strength and consequently the danger of plasma discharges is also significantly reduced.

FIG. 5 also clearly shows that the core 2, i.e. the actual electrode, approximately in a center of the pressure zone, comes so close to the workpiece 5a or the upper section to be welded that a field strength sufficient for welding is guaranteed.

Here the use of the inflatable tire 3 offers a further advantage. Both the contact pressure applied to at least one workpiece 5a, 5b and the length of the contact pressure zone can be determined by the degree of inflation of tire 3. For example, several test runs can be conducted with different filling levels of tire 3 to determine which filling level produces the best welding result. This can depend, among other things, on the length of the pressure zone 13 and/or the pressure applied.

FIG. 6 shows that the generator 4, which produces the high-frequency alternating electrical voltage, is connected to the core 2 via a supply line 9 and a collector 10, which is designed in the form of a sliding contact. Furthermore, the flat counter electrode 8 is grounded and there is a coupling between the reference potential and the generator 4 via the principle of capacitive coupling between the flat counter electrode 8 and the generator 4.

The mode of operation of the apparatuses shown in FIGS. 7 to 10 and the advantages of using the roller electrode assemblies 1 are analogous to those described above in FIGS. 3 to 6. The mode of operation and advantages of course apply both to the roller electrode assemblies 1 shown above in FIGS. 7 to 10 and to the roller electrode assemblies 1 shown below, which represent the counter-electrode. Only for illustration purposes, one of the essentially wedge-shaped areas 14 is shown in FIG. 7 in a disproportionately enlarged form and not only indicated by an arrow 6. Due to the curvature of tire 3, area 14 is actually only approximately wedge-shaped, and of course, it is not actually present as a delimited area.

As shown in FIG. 8, only the upper roller electrode assembly 1 is connected to a first output of generator 4. Accordingly, the roller electrode assembly 1 shown below and a second output of generator 4 are grounded.

By "+HV" and "−HV" in many figures a polarity of the voltage produced by generator 4 is shown as a snapshot. The polarity of the outputs of generator 4 of course changes with the frequency of the alternating voltage generated.

Compared to the assembly shown in FIG. 8, according to which the roller electrode assembly 1 shown in the bottom of the figure and the generator 4 are grounded, the assemblies according to FIGS. 9 and 10 have the advantage that the roller electrode assemblies 1 shown in the bottom of the figures are connected to the generator 4. The lower and the upper roller electrode assemblies 1 are applied with opposite polarity of the electrical alternating voltage according to the assemblies shown in FIGS. 9 and 10. This can further reduce the risk of plasma discharges, since the difference of potential between the electrodes or cores 2 does not result from a difference to the grounded zero potential.

The grounded support table 12 further increases safety.

Although only some preferred examples of the invention have been shown and described, it is obvious that the skilled person can add numerous modifications without departing from the spirit and scope of the invention.

For example, instead of a table, a frame or the like may be considered.

Furthermore, all of the above-mentioned embodiments may include such a table, frame or the like for storing the workpieces to be joined 5a, 5b or for holding them during welding. Such a table, such a frame or the like can thus be used solely for holding or storing the workpieces 5a, 5b or sections to be joined, or additionally as a counter pressure element and, if necessary, counter-electrode.

In all embodiments, tire 3 can either be provided only on the tread of core 2 or partially surround core 2, as shown in FIGS. 3 to 10. It is also conceivable that tire 3 completely surrounds core 2, thus making the dielectric cover plates 17 dispensable. In this case, tire 3 should preferably be arranged in such a way that it can effectively prevent sparking by plasma formation. The assembly as shown in FIGS. 3 to 10 is particularly preferred, where the tread of core 2 and directly adjacent sections of the side surfaces of core 2, but not the entire side surfaces, are covered by tire 3.

The dielectric cover plates 17 can also be dispensed with.

If welding of two workpieces 5a, 5b is mentioned, the welding of two sections of one or more workpieces shall always be encompassed.

The device 11 for contactless transmission does not necessarily have to be designed as a U-shaped electrode; other such devices can also be used. These can work according to the principle of capacitive coupling, but other possibilities of contactless energy transmission can also be considered. Of course, with regard to all roller electrode assemblies 1, both a contacting transmission as shown in FIG. 6 and a contactless transmission as shown in FIGS. 8 to 10 can be considered.

The direction of movement 19 in the figures always refers to the movement of the roller electrode assemblies 1 relative to the workpieces 5a, 5b, so it is a relative indication. Although the roller electrode assembly 1 is preferably moved relative to the workpieces 5a, 5b, the opposite case is also possible. If the workpieces 5a, 5b to be welded are moved relative to one or two fixed roller electrode assemblies 1, the movement of these workpieces 5a, 5b is carried out in the opposite direction of arrow 19 with respect to FIGS. 5 and 7.

Furthermore, in all embodiments comprising two roller electrode assemblies 1, it may be considered to connect only one of the roller electrode assemblies 1 to the generator 4 and to ground the second roller electrode assembly 1. Especially with regard to FIGS. 7 to 10, this applies to both the roller electrode assembly 1 shown at the top and to the roller electrode assembly 1 shown at the bottom.

The demi-axes 15 can of course be beared in suitable bearings (not shown). The demi-axes 15 can be electrically insulated to prevent, for example, a user from coming into direct contact with the demi-axes 15.

| Reference number list | | |
|---|---|---|
| 1 | Roller electrode assembly | 34 |
| 2 | Core | 35 |
| 3 | Tires | 36 |
| 4 | Generator | 37 |
| 5 | Workpiece | 38 |
| 6 | Arrow | 39 |
| 7 | roller electrode | 40 |
| 8 | Planar counter electrode | 41 |
| 9 | Supply line | 42 |
| 10 | collector | 43 |
| 11 | Device for contactless transmission | 44 |
| 12 | Grounded support table | 45 |
| 13 | Length of the pressure zone | 46 |
| 14 | Wedge-shaped area | 47 |
| 15 | demi-axes | 48 |
| 16 | Interior | 49 |
| 17 | Dielectric cover plate | 50 |
| 18 | | 51 |
| 19 | Direction of movement | 52 |
| 20 | axis of rotation | 53 |
| 21 | | 54 |
| 22 | | 55 |
| 23 | | 56 |
| 24 | | 57 |
| 25 | | 58 |
| 26 | | 59 |
| 27 | | 60 |
| 28 | | 61 |
| 29 | | 62 |
| 30 | | 63 |
| 31 | | 64 |
| 32 | | 65 |
| 33 | | 66 |

The invention claimed is:

1. An apparatus for applying a high-frequency alternating electric field to a workpiece (5a, 5b) for joining the workpiece by high-frequency welding, comprising:
   a high-frequency generator (4) and at least one roller electrode assembly (1) comprising a core (2) at least partially formed of electrically conductive material and a tire (3) surrounding the core and which can be filled with a protective gas and consists of a dielectric material.

2. The apparatus according to claim 1, wherein the high-frequency alternating electric field has a frequency within an ISM band.

3. The apparatus according to claim 1, wherein the at least one roller electrode assembly is spherical or cylindrical.

4. The apparatus according to claim 1, further comprising a counter-electrode assembly (1) comprising an additional core (2) at least partially formed of electrically conductive material and an additional tire (3) surrounding the additional core and which can be filled with protective gas and consists of dielectric material.

5. The apparatus according to claim 1, wherein the at least one roller electrode assembly (1) is arranged to be actuated to transport the workpiece (5a, 5b) to be processed.

6. The apparatus according to claim 1, further comprising an apparatus (11) for contactless energy transfer to the at least one roller assembly.

7. The apparatus according to claim 1, further comprising a table as a counter-pressure element to the at least one roller electrode assembly.

8. The apparatus according to claim 7, wherein the at least one roller electrode assembly (1) is guided by an axis system or on an articulated robot.

9. The apparatus according to claim 1, wherein the protective gas is selected from the group consisting of: sulphur hexafluoride or a gas mixture containing sulphur hexafluoride, a fluoronitrile or a gas mixture containing a fluoronitrile, a fluoroketone or a gas mixture containing fluoroketone, and carbon dioxide or a gas mixture containing carbon dioxide.

10. The apparatus according to claim 1, wherein the tire (3) has a valve for introducing and/or removing the protective gas.

11. A method for joining by high-frequency welding using the apparatus of claim 1, comprising:
applying a high-frequency electric alternating field to two plastic sections of at least one workpiece (5a, 5b) and applying a force to the at least one workpiece (5a, 5b) with the at least one roller electrode assembly (1), wherein the high-frequency electric alternating field has a frequency within an ISM band.

12. The method according to claim 11, further comprising transmitting the high frequency electric field to the at least one roller electrode assembly (1) in a contactless manner.

13. The method according to claim 11, wherein the at least one roller electrode assembly (1) applies the force to the at least one workpiece (5a, 5b) in such a way that the protective gas inside the tire (3) is displaced so that the core (2) rests directly on the tire (3) in the center of a pressure zone (13).

\* \* \* \* \*